(12) United States Patent
Hopmann et al.

(10) Patent No.: US 6,499,031 B1
(45) Date of Patent: Dec. 24, 2002

(54) SYSTEMS AND METHODS FOR USING LOCKS WITH COMPUTER RESOURCES

(75) Inventors: Alexander I. Hopmann, Seattle; Van C. Van, Kirkland; Brian J. Deen, North Bend, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,753

(22) Filed: Jul. 26, 1999

(51) Int. Cl.[7] .............................................. G06F 17/30
(52) U.S. Cl. ............................... 707/8; 707/9; 709/104; 710/36; 710/220; 710/240
(58) Field of Search ................................. 707/8, 9, 1–6, 707/10; 713/200–202; 709/217–219, 104–107; 380/25; 710/36, 200, 220, 240–244

(56) References Cited

U.S. PATENT DOCUMENTS

| | | | | |
|---|---|---|---|---|
| 5,774,551 A | * | 6/1998 | Wu et al. | 380/25 |
| 5,832,484 A | * | 11/1998 | Sankaran et al. | 707/8 |
| 5,867,494 A | * | 2/1999 | Krishnaswamy et al. | 370/352 |
| 5,889,952 A | * | 3/1999 | Hunnicutt et al. | 709/219 |
| 6,065,117 A | * | 5/2000 | White | 713/159 |
| 6,160,547 A | * | 12/2000 | Roth | 345/328 |

* cited by examiner

*Primary Examiner*—Hosain T. Alam
(74) *Attorney, Agent, or Firm*—Workman, Nydegger & Seeley (57) ABSTRACT

Provided is a method for locking computer resources and for accessing locked computer resources. Resources being used by remote users can be locked such that other remote users and local users have restricted access to those resources. The remote user provides the resource to be locked, the type of lock to place on the resource and the duration of the lock. If the resource is available and the user has the proper credentials and the proper access permissions, the resource is locked and a lock token is provided to the remote user. A resource handle is also provided to the remote user. Once a resource has been locked, the lock token must be provided and verified before access to the resource is granted. Because the locks can be discovered, a security token of the owner of the lock is associated with the lock token. The security token of the remote user must also match the security token associated with the stored lock token before access to the resource is granted. The locks can either expire or be refreshed. If a lock expires, it is removed from memory and the resource handle is released. Also, particular user agents are given a fixed lock token in order to access system resources. These particular agents view the resource as locked, but the non-unique fixed lock token indicates to the system that the resource is not in fact locked. Other particular agents are given an extended timeout period to account for real time latencies of the computer system.

36 Claims, 4 Drawing Sheets

SYSTEMS AND METHODS FOR USING LOCKS WITH COMPUTER RESOURCES

BACKGROUND OF THE INVENTION

1. The Field of the Invention

The present invention relates to the management of system resources. More specifically, the present invention relates to serializing access to system resources by allowing system resources to be locked.

2. The Prior State of the Art

A significant advantage of computer networks is that a user can remotely access a document, an image, a printer, or other resource. Computer networks, and the internet in particular, have rendered the geographical location of the user irrelevant. The internet contains a vast amount of resources that are available to practically anyone with an internet connection. In a similar manner, local area networks, such as those used by businesses, can make documents, applications, printers, and other resources available to anyone connected to the local area network.

This ability to remotely access a resource has greatly enhanced the ability of people and businesses to work together more quickly and efficiently. This is especially true of a resource that is collaboratively produced. Before the advent of the internet and the prolific use of email, a resource, such as a document, that was produced by a group of authors required a significant amount of time and effort to produce. One reason for this delay is that updates and revisions to the document had to be circulated using regular mail systems. Keeping track of the most current edition of the document was also difficult because all the authors had different copies and were simultaneously making updates and revisions to potentially different revisions of the document.

Currently, email is the method of choice when persons collaborate on a document. Email has significantly reduced the time required to produce a collaborative document, but it is still difficult to keep track of the most current update. When authors are sending a document back and forth via email, each author can acquire multiple copies of a document on their computer. Each copy or revision of the document will most likely have a similar name and updated revisions emailed from various authors may arrive at different times. Because the names of revisions are similar, it is possible for the revision of one author to overwrite the revision of another author. This can require the changes and edits to be entered on yet another document. If the document is large, email can present additional problems which are related to the size of the document, especially when the network is busy. Encoding problems can also prevent a document from being successfully emailed. This is especially true when privacy is a concern.

This problem is rot limited to documents but can apply to a variety of different computer resources. The Internet, for example, is primarily a retrieve and read medium. A web page is downloaded to a local computer and read. For that reason, a web page being designed by several persons presents similar challenges. When a web page designer accesses a web page to make an update, the web page is downloaded to a local computer to be edited by that designer. The original web page, however, is still accessible by other designers. If another designer simultaneously decides to update the same web page, the second designer will download the web page and make changes. The problem is that the designers are not aware of each other or the changes being made. The result of this scenario is that one of the designer's changes will be overwritten when the other designer uploads an update to the web page.

Using today's technology, more and more of the work done by people and businesses is being done collaboratively. People work together in groups to create presentations, budgets, Advertisements, business plans, web sites and more. The global nature of he internet permits collaborative groups to be dispersed geographically and existing technology simply does not permit these groups of people to easily collaborate while producing a product. There is a need for protecting the work product of a group of people such that one person's work isn't inadvertently destroyed or overwritten. More generally, there is a clear need for a technology that permits remote users and groups of users to more effectively use and monitor computer resources. One effect of such technology would be that documents could no longer be inadvertently overwritten.

SUMMARY AND OBJECTS OF THE INVENTION

In response to these and other problems, the present invention provides systems and methods for serializing access to computer resources. Serialized access is achieved by allowing remote clients to place locks on computer resources. A lock can be a read lock, a write lock or any other type of lock desired by the remote user and supported by the system. The lock is granted for a specific amount of time, which may be refreshed each time the resource is accessed within the amount of time allotted for the lock. The lock is also enforced against local users and clients by passing a resource handle to the remote client when the lock to the resource is granted.

When a remote client or user locks a resource, a lock token is generated. The lock token is given to the remote client and is also stored in the memory of the system being accessed by the remote client. When the remote client attempts to access the resource at a later time, the system responds that the resource is locked. The remote client presents a lock token that must match the lock token stored in memory for that resource before access is granted. As an additional security measure, the identity of the remote user is authenticated when the remote user accesses the system. A security token is generated which is remembered by the system and associated with the lock token stored in memory. In order to access the locked resource, both the lock tokens and the security tokens must match. The reason for employing security tokens is because the list of lock tokens stored in the system memory is discoverable by other remote users. In this manner, system resources can be locked and accessed.

The locks expire or terminate in at least two different methods. First, a lock is removed from memory when a remote user attempts to access a locked resource and the system discovers that the resource has timed out. In this case, the remote user is denied access, the lock token is removed from memory, and the resource handle is released. Second, an idle thread of the system periodically cycles through the lock tokens stored in memory to determine if they have expired. Those that have expired are removed from memory and the associated resource handles are released.

Particular user agents have certain issues related to locks. For some user agents, a fixed lock token is generated and given to that user agent. A fixed lock token is always recognized as valid and access to the resource is granted even though the resource is not actually locked. If the resource is locked by another user agent when a fixed lock is presented, access is denied. In another case, the timeout period granted to some user agents is extended to account for real time latencies that may exist when the user agent attempts to refresh the timeout period near its expiration point.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Serializing access to computer resources may be achieved by permitting remote and local clients to lock a particular resource for a certain amount of time. A main objective of locking resources is to prevent the work or data of one client from being overwritten by another client. Another benefit of locking resources is that a single resource can be used to produce a collaborative uncork. By locking or restricting access to a resource, the work of each client is assured of being preserved and each subsequent client that accesses the resource receives the most current version of that resource.

The ability to lock a resource is especially useful to clients having remote access to a system. In the case of a document which is being collaboratively written, there is preferably only one version of the document and it is accessible by the remote clients using a uniform resource locator (URL). In this scenario, the first client locks the document and while the document is locked, other remote clients cannot access the document in this embodiment. In another embodiment, the other remote clients would be able to read the document, but would be unable to write to the document. The access rights of other remote clients is dependent on the type of lock placed on the resource. In this manner, the changes or contributions of the first remote client are preserved while the document is locked.

When the lock of the first client is terminated, another remote client can then access the document and lock it while revisions are made. Rather than email a copy the revised work product to each of the other authors, which may lead to the problems previously described, a remote client can simply email the UTRL of the revised document to the next remote client, who can then lock the document while additional comments and revisions are made. In this manner, a document can be collaboratively written by a group of authors without the authors having to sort through a number of revisions and without the problem of overwriting another's work. The present invention is not limited to documents, but can be extended to other resources and other scenarios, some of which are described herein.

The present invention is described in terms of diagrams and flow charts. Using the diagrams and flow charts in this manner to present the invention should not, however, be construed as limiting its scope.

The embodiments of the present invention may comprise a special or general purpose computer comprising various computer hardware. Other embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions. The computer-executable instructions and associated data structures represent an example of program code means for executing the steps of the invention disclosed herein.

Figure 1:
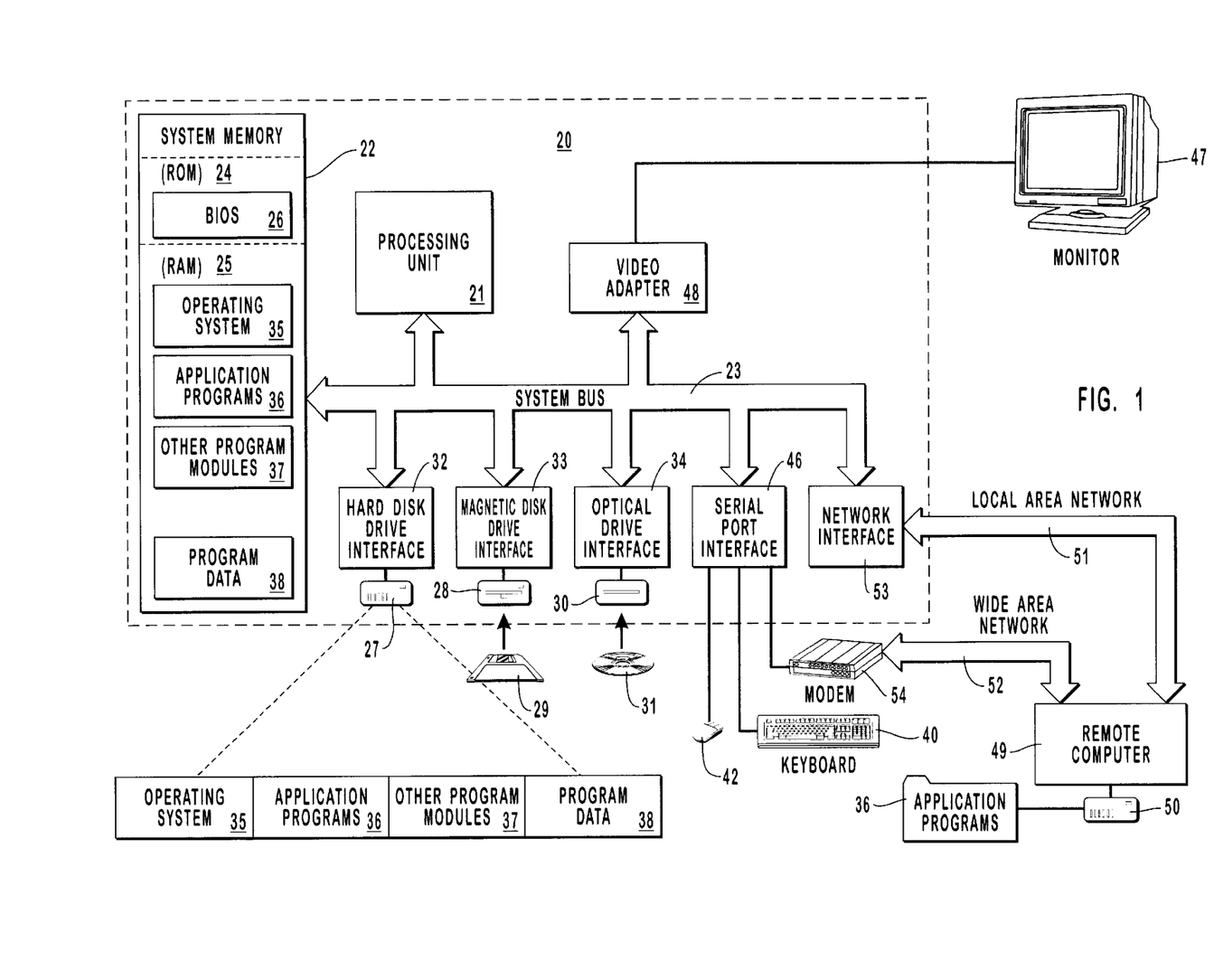
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, main e computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples is 18 various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

As used herein, a resource refers to computer readable media, programs, processes, threads, applications, memory, printing devices, networks, network connections, files, folders, directories, input/output devices, ports, documents, spreadsheets, operating systems, and more. In other embodiments, resource may refer only to data or files stored on computer readable media. More generally, however, a resource is an object, device or entity that can either receive or send data. As used herein, a file system is a system that an operating system uses to manage the available resources. Also, user and client are used interchangeably herein. A local client refers to users, processes, or threads that access system resources on the server computer or local machine. A remote client refers to users, processes or threads that access system resources from a machine different from the server computer.

Before describing the present invention in farther detail, it is necessary to briefly discuss the relationship between an operating system, processes and threads. The operating system of a computer network typically manages the processes pertaining to one or more users of the network. Processes can be represented as tasks the operating system must do and a thread is representative of one of the many jobs that must be done to accomplish the task. Each process being managed by the operating system usually has one or more threads. These threads are typically executing concurrently and under these conditions, it is possible for an operating system to be executing two or more separate threads that relate to a single resource. One thread , f or instance may be trying to read the resource while the other thread is trying to delete the resource. Alternatively, both threads may be writing to the same resource. In either event, the resource can become corrupted in some circumstances.

Typically, when a resource is opened by a thread, the reason for opening the resource is specified and is usually a read or a write. If one thread has opened a resource for reading and another thread attempts to write to that resource, an error will be generated. However, when remote clients are added to the network, a resource is more likely to be corrupted because the connection between a remote client and the system is not constant. For example, in Hyper Text Transfer Protocol (HTTP), a connection is established just long enough for the data to be transferred. Once the connection is dropped, the resource is no longer protected and another remote user or a local user can access the resource even if the original remote client is not yet finished. In this manner, the resource can be easily corrupted.

A lock prevents a resource from becoming corrupted and serializes access to system resources. Locking a resource for a particular user or group of users is a detailed process and presents several issues. The first issue is identifying the resource to be locked, the type of lock to be placed on the resource and the length or duration of the lock, which is referred to herein as the timeout period. This information is supplied to the system by the remote client.

The next issue is determining the current status and availability of the resource. If the resource is available, a lock may be given to the remote client as requested. If the resource is unavailable, a number of options, which will be described below, are available to the remote client. Issuing a lock to a remote client may also involve an analysis of the remote client to determine if the remote client has the capability to use locks.

Figure 2:
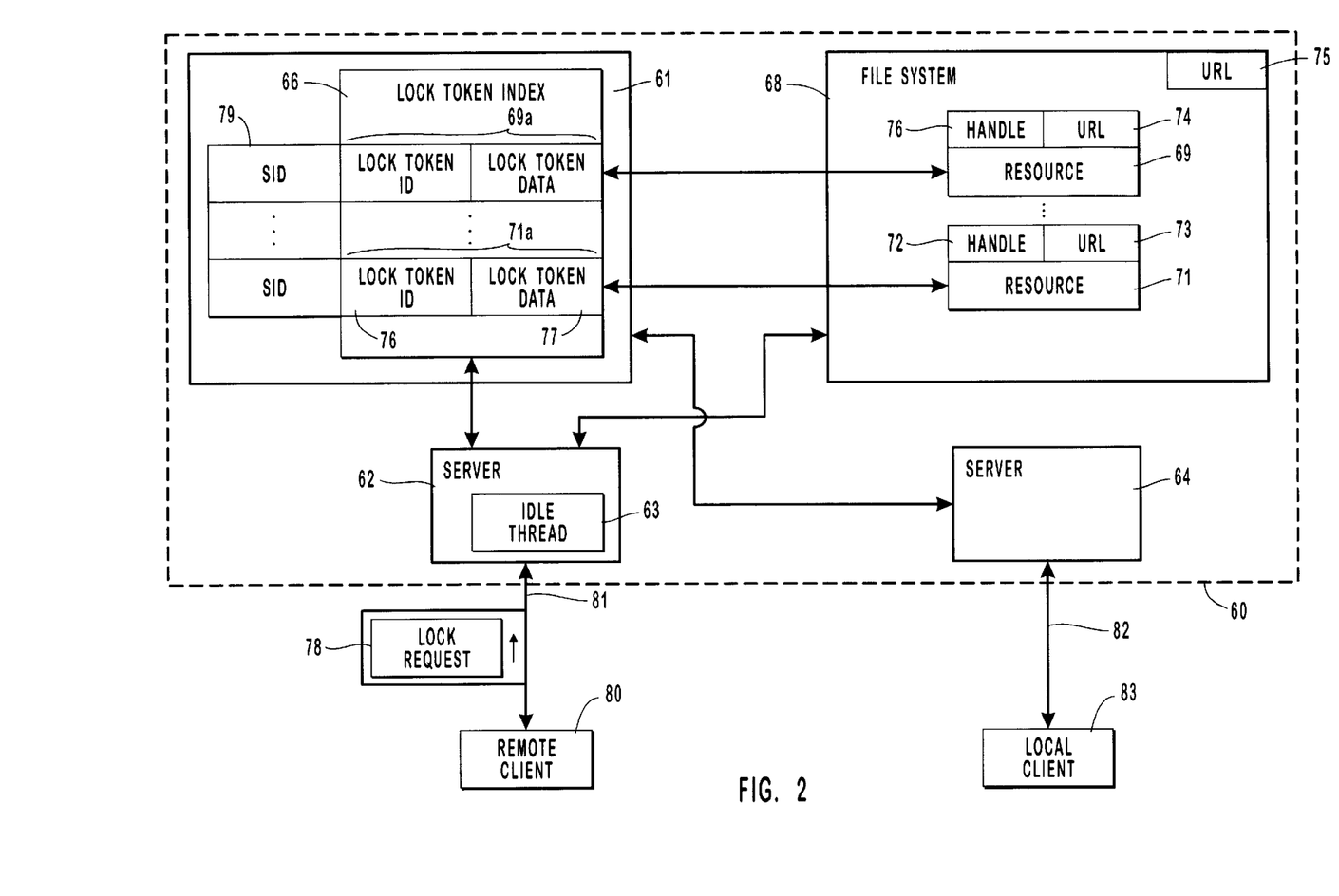
FIG. 2 is a block diagram of one embodiment of a system implementing locks on system resources.

FIG. 2 is a block diagram of an exemplary system for implementing locks and is used to describe the methods and procedures for locking resources. Remote client 80, in this embodiment, is a computer that has access to system 60 via internet connection 81. System 60 is a server computer system or any other computer system that is capable of being remotely accessed. As a consequence of having internet connection 81, remote client 80 has sessionless access to system 60. Sessionless access implies that internet connection 81 between remote client 80 and system 60 functions when needed. In other words, when remote client 80 accesses system 60, a socket is created for that access. When access is no longer required by remote client 80, the socket is dropped.

Remote client 80 communicates with system 60 through server 62 which provides remote client 80 access to system 60 and the resources of system 60. Server 64 provides local client 83 access to system 60 over ethernet connection 82. File system 68, as illustrated, comprises resources 69 and 71 and other resources not shown. File system 68, as well as resource 69 and 71 are typically referenced by remote client 80 using a uniform resource identifier (URI).

A uniform resource locator (URL), which is frequently used when accessing a resource over an internet connection is a type of URI. File system 68 is identifiable by URI 75, resource 69 is identifiable by URI 74 and resource 71 is identifiable by URI 73. For example, URI 75 may be represented as "//foo.bar.com/," which may correspond to a physical disk drive of "G:\." In this instance, URI 74, of resource 69 may be represented as "//foo.bar.com/ resource69" and URI 73 of resource 71 may be represented as "//foo.bar.com/resource73." This is one example of how remote client 80 can identify file system 60 and the resources of file system 60. Server 62 handles all requests from remote client 80 and accesses the resources of system 60 on behalf of remote client 80.

When remote client 90 desires to access and lock a resource of system 60, lock request 78 is sent to and received by server 62. Lock request 78 comprises the resource to be locked, the type of lock desired by remote client 80, and the timeout period of the lock. As indicated previously, the resource is typically identified by a URI. The type of lock depends on how remote client 80 intends to use the resource. Exemplary types of locks include a multi-reader single writer lock and an exclusive lock. A multi-reader single writer lock may permit others to read the resource, but will allow only the owner of the lock to write to the resource. An exclusive lock will allow the owner of the lock to access the resource while excluding or preventing all other users from accessing, reading, and writing to the resource. The timeout period of the lock is determined by system 60 and will not necessarily match the timeout period requested by remote client 80. Remote client 80 is informed, however, of the timeout period that was allocated to the lock.

If a lock is granted to remote client 80, a unique lock token is generated and associated with the resource being locked. In FIG. 2, lock token 69' is associated with resource 69 and lock token 71' is associated with resource 71. A lock token comprises lock token ID 76 and lock token comments 77. Lock token ID 76 is also provided to remote client 80 and serves as a key for accessing the locked resource during the timeout period. If remote client 80 attempts to access a locked resource without providing the lock token ID, remote client 80 will be denied access to the locked resource. Lock token comments 77 comprises the timeout period of the lock, the type of lock, the last time the remote client accessed the resource, and any other information desired by system 60 or remote client 80. For instance, remote client 80 may desire a lock that allows certain other remote clients to read the resource. This information may be indicated and stored in lock token comments 77. Alternatively, lock token comments 77 may contain an email address which enables other remote users to email the owner of the lock.

Once a lock token has been generated, it is stored in lock token index 66. Lock token index 66 is preferably implemented in RAM 61 and comprises a list or an index of all the lock tokens which have been granted to various remote clients. Lock token index 66 can be implemented as a hash or any other method. Lock token index 66 may also contain the lock tokens which have been granted to local clients. Lock token index 66 is potentially viewable by other remote or local clients. For that reason, a security ID (SID) of remote client 80 is preferably associated with each lock token owned by remote client 80.

When a remote client accesses system 60 through server 62, the identity of remote client 80 is authenticated and a SID is generated. In many instances, the identity or remote client 80 is authenticated by requiring that remote client 80 supply a user name and password when logging onto the system. The SID of remote client 80 is associated with any lock tokens given to remote client 80. When remote client 80 seeks access to a resource by presenting a lock token, the lock token is verified and the SID of remote client 80 is compared with the SID associated with the lock token stored in lock token index 66. If the lock tokens match and the SIDs match, then remote client 80 is permitted to access the locked resource as long as the lock has not expired. If the SIDs and the lock tokens do not match, remote client 80 is denied access to the locked resource. The use of SIDs is not required, but their use enhances the security of the lock because the lock tokens may be discoverable by other clients.

Figure 3:
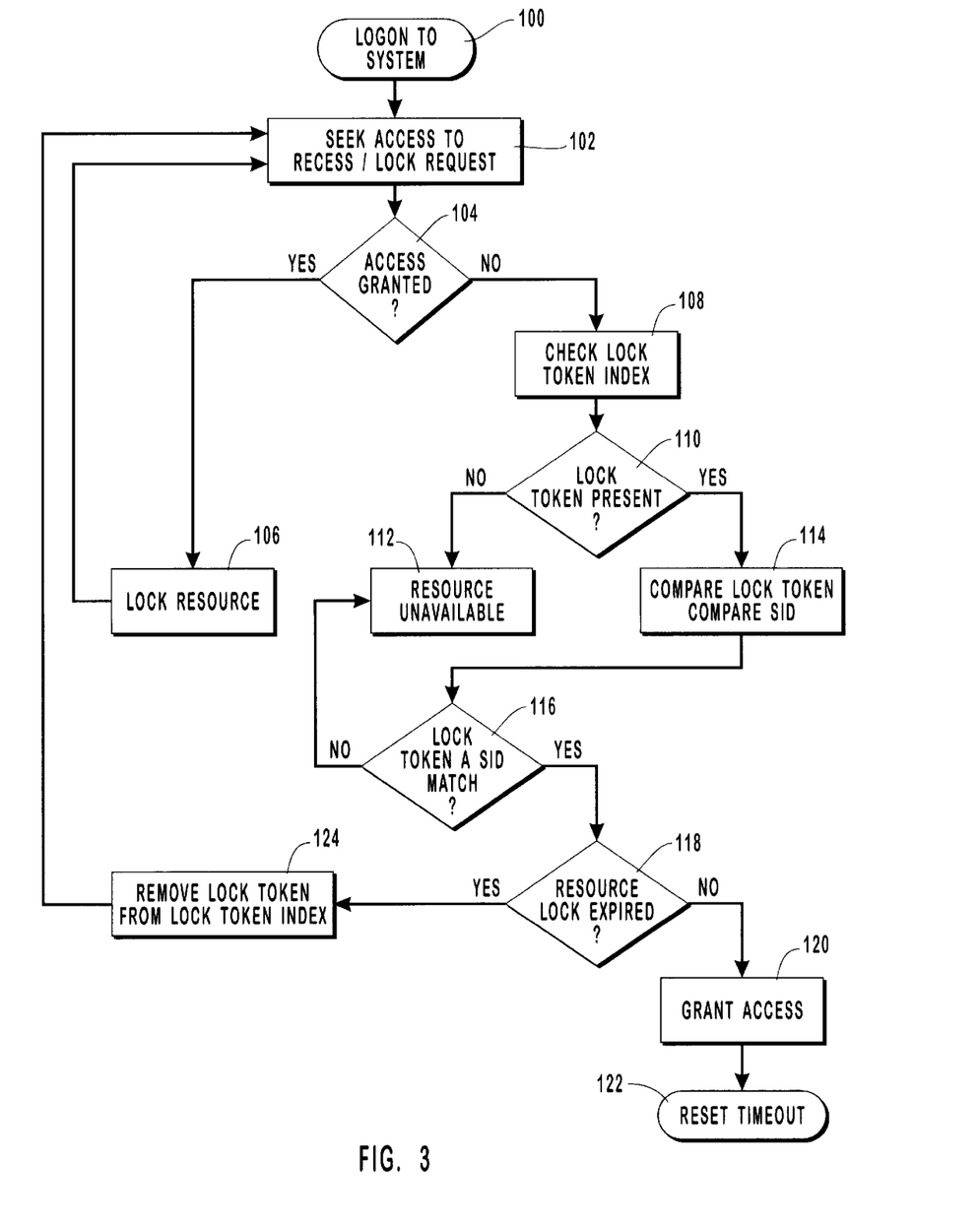
FIG. 3 is a flow chart of one embodiment of a method for accessing a locked resource and for accessing a locked resource.

FIG. 3 is a flowchart illustrating one embodiment of a method for locking a resource. In step 100, the remote client logs on to a system through a server. The log on process authenticates the identity of the remote client and a SID is associated with that remote client and with any lock token provided to that remote client. SID is also referred to herein as a security token. Once the remote client is connected with the system, the remote client attempts to access a resource of the system in step 102. Preferably, the remote client attempts to access and lock the resource first because it is likely that the resource is available. In another embodiment, a determination of whether the resource is unavailable or locked could be made first.

The system, upon receiving the request from the remote client to access a resource, attempts to obtain that resource for the remote client in step 104. If the resource is available, then the lock request of the remote client is executed and the resource is locked in step 106. The lock request from the remote client contained, at a minimum, the resource to be locked, the timeout period of the lock and the type of lock. The system locks the resource for the remote client and returns a resource handle and a lock token. The resource handle is an important aspect of resource locking because the resource is not effectively locked to local clients unless a resource handle is given to the remote client. In this manner, the resource is unavailable to local clients, according to the lock, even when the HTTP connection between the remote client to the system is dropped. In other words, the present invention takes advantage of the security aspects of the computer system and enforces that security on local clients. By passing a resource handle, the remote client is effectively employs the security of the system for unauthorized access by non-remote users as well a remote users. As indicated previously, the lock token contains a lock token ID, the timeout period of lock, the type of lock and other data which may be indicated by the remote client or the system.

If access to the resource is denied in step 104, then the lock token index is checked in step 108. If a lock token for the resource is not present in the lock token index in step 110, then the resource is unavailable to the client in step 112 and the client must seek access at a later time. If the lock token is present in the lock token index then the remote client presents a lock token to the system. If the remote client does not have any lock tokens, access denied and must be attempted at a later time. Assuming that the remote client has a lock token to present, the lock token presented by the remote client is compared with the lock token stored in the lock token index instead 114. More specifically, presenting a lock token indicates that the lock token ID is presented and compared rather than the lock token ID and the lock token comments. Additionally, the security token or SID of the remote client is also compared to the security token or SID associated with the lock token in the lock token index. It is not necessary to associate a -security token or a SID with a lock token and it is not necessary to procure the security token or SID of the remote client. However, the lock token index may be discoverable by other remote and/or local clients. For those reasons, the security token or SID provides additional security to ensure that the actual owner of the lock token accesses the locked resource.

If the lock token provided by the remote client matches the lock token stored in the lock token index and the identity of the remote client is verified by a comparison of the security tokens or SIDs, access to the resource is permitted unless the system determines that the timeout period has expired. When a lock on a resource is initially granted, the time of the grant becomes the last access time. When a resource is later accessed, the current access time is compared with the last access time and if the difference between the current and last access times is greater than the timeout period of the lock granted by the system, then access to the resource is denied to the remote client and the lock token is removed from the lock token index in step 124. Also, the resource handle is released and the remote client must seek access at a later time in step 102.

If the lock has not expired in step 118, then access to the resource is granted to the remote client in step 120. In step 122, the timeout period of the lock is restarted or refreshed. In one embodiment, the last access time is updated to the current access time and the remote client has a lock on the resource for the timeout period previously granted. In other embodiments the last access time is not updated and the lock will expire as previously determined by the timeout period of the lock.

Another method for causing locks to time out or expire is illustrated in FIG. 2 where server 62 comprises an idle thread 63. Idle thread 63 is a low priority thread that periodically executes. The function of idle thread 63 is to examine each lock token in lock token index 66 and compute an idle time. If the idle time is greater than the time out period for equal lock tokens, then idle thread 63 removes the expired lock token 63 from memory and the corresponding resource handle of the locked resource is also released. One advantage of idle thread 63 is that a resource is prevented from becoming indefinitely locked. Because the lock token index and each lock token contained in the lock token index can be viewed as a resource, idle thread 63, in a preferred embodiment, has a multi-reader single writer lock on those resources when it executes. In other words, other remote clients can read the lock tokens when idle thread 63 is executing, but they cannot write to the lock tokens in order to update the last access time. If idle thread 63 decides that the lock has timed out or expired, their its lock is promoted to a write lock while the lock token is being removed. In this manner, a remote client will view the resource as unavailable and the integrity of the system is ensured.

The flowchart of FIG. 3 is an exemplary method for using locks on system resources. The order of the steps can be varied, but the functions or submethods remain. One function is to create a lock on an unlocked resource. Another function is to attempt to access a resource that is currently locked. Another submethod relates to expired locks. A remote client does not have to execute all of the steps illustrated in FIG. 3. A remote client may execute only a submethod.

Figure 4:
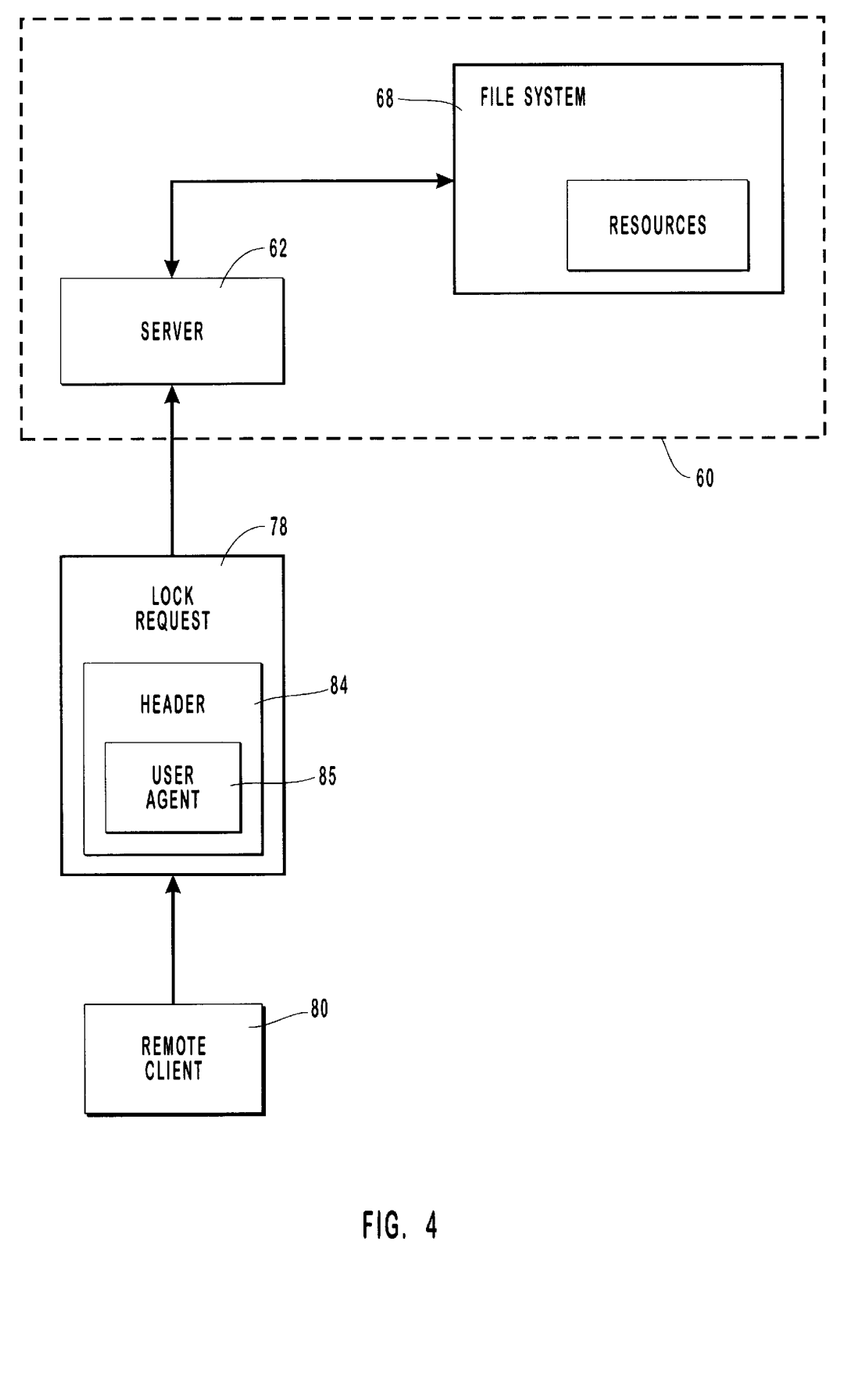
FIG. 4 is a block diagram illustrating the a lock request of a particular user agent.

FIG. 4 is illustrative of certain lock requests which cause server 62 to respond differently from other lock requests. Lock request 78 comprises header 84 which contains, in most instances, user agent 85. In one embodiment, user agent 85 is indicative of the software utilized by remote client 80. When lock request 78 is received by server 62, header 84 is examined, in a preferred embodiment, and user agent 85 or the value of user agent 85 is extracted and determined.

For the majority of user agents 85, a unique lock token is generated and returned. For particular user agents 85, a standard non-unique value is returned as a lock token. The effect of providing a non-unique value permits remote client 80, which has a particular user agent 85, to execute normally. When remote client 80 attempts to access the resource again, the non-unique lock token is presented to server 62. Server 62 recognizes this non-unique lock token and server 62 responds as if the non-unique lock token were a valid lock token. For this particular user agent 85, the resource appears locked when in fact the resource is not locked.

Another situation arises for a particular user agent 85 when remote client 80 attempts to refresh the timeout period of a lock on a particular resource. When the timeout period expires, the lock is extinguished and the resource is released. If remote client refreshes the lock, then the timeout period starts over from the time the remote client accessed the resource. It is possible, in this manner for a remote agent to keep a resource locked for a period of time longer than the timeout period.

For a particular user agent 85, the timeout period requested by remote client 80 is extended by an extra timeout period. Remote client 80 may be unaware of the extra timeout period and may be operating under the presumption that the resource is locked for the timeout period. The extra timeout period is provided for this particular user agent 85, because an error can occur if the remote client 80 attempts to refresh the lock near the end of the original timeout period. The real time latency existent in networks could cause the resource to become unlocked before the lock is refreshed. The extra timeout period compensates for this latency and permits this particular user agent 85 to refresh the timeout period when it would have normally expired. Preferably, the extra timeout period is 120 seconds. Thus if remote client 80 requests a timeout period of 60 seconds, an actual timeout period of 180 seconds is granted by server 62. Remote client 80, however, is unaware of the extra 120 seconds. In this manner, this particular user agent 85 is protected from inadvertently losing the locked resource.

The present invention has been substantially described in terms of a remote client having the ability to lock a system resource. It is understood that the present invention applies also to local clients as well as to mixed groups of local and mixed clients. A remote client can lock a resource such that neither local clients or other remote clients cannot access the locked resource. Similarly, a local client can lock a resource from a remote or local client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system including a resource that is accessed by one or more clients, wherein the one or more clients make changes to the resource, a method for providing the one or more clients with access to a resource such that each change made to the resource by a client is not corrupted by the other clients, the method comprising steps for:

receiving an access request to the resource from a client;

determining if the resource is locked, wherein an original lock token was issued to a locking client that locked the resource and the lock token was stored in a lock token index of the computer system, wherein a lock on the resource that corresponds to the original lock token determines how clients other than the locking client access the resource;

requiring the client to present an access lock token;

comparing the access lock token presented by the client to the original lock token stored in the lock token index; and granting the client access to the resource if the access lock token matches the original lock token.

2. A method as defined in claim 1, wherein the step for receiving an access request further comprises steps for:

authenticating the identify of the client; and associating a security token with the client.

3. A method as defined in claim 1, further comprising granting the client access to the resource if the resource is available and unlocked.

4. A method as defined in claim 1, wherein the step for comparing the access lock token presented by the client further comprises steps for:

obtaining a security token of the client;

comparing the security token of the client with a stored security token previously associated with the stored lock token; and granting access to the resource if the security tokens match.

5. A method as defined in claim 1, wherein the step of granting access to the resource further comprises a step for restarting a timeout period.

6. A method as defined in claim 1, wherein the step for granting the client access to the resource if the access lock token matches the original lock token further comprises restricting access to the resource by other clients according to the lock on the resource.

7. In a computer system where one or more clients including local clients and remote clients access a resource of the computer system, a method for locking a resource of a system by a remote client such that the resource is locked to other clients, the method comprising steps for:

logging the remote client into the computer system;

receiving a lock request from the remote client to lock the resource;

determining whether the resource to be accessed on the system is available and not locked by either another remote client or another local client;

providing the remote client with a lock token to the resource if the resource is available, wherein the lock token is also stored in a lock token index of the computer system; and locking the resource for the remote client with a lock, wherein the lock determines how other remote clients and other local clients access the locked resource.

8. A method as defined in claim 7, wherein the step for logging the remote client into the computer system further comprises steps for authenticating the identity of the remote client and associating a security token with the remote client.

9. A method as defined in claim 7, wherein the lock request comprises: the resource to be locked; a timeout period of the lock; and a type of lock.

10. A method as defined in claim 7, wherein the step for determining whether the resource to be accessed is available and not locked by either another remote client or another local client further comprises a step for accessing the resource unless access to the resource is prevented by the computer system.

11. A method as defined in claim 7, wherein the lock token comprises a lock token ID and a lock token comment.

12. A method as defined in claim 7, wherein the step for locking the resource further comprises steps for:

providing a resource handle of the resource to the remote client; and associating the lock token with the security token of the remote client.

13. A method as defined in claim 7, wherein the step for locking the resource further comprises a step for providing a timeout period to the remote client.

14. In a computer system that has a resource that is accessed by one or more clients, a method for accessing a locked resource of the computer system by a client such that the locked resource is not corrupted by other clients, the method comprising:

logging the client into the computer system;

authenticating an identity of the client;

receiving a lock token from the remote client, wherein an original lock token is stored in a lock token index of the computer system;

comparing the lock token received from the client to the original lock token stored in the lock token index;

accessing the locked resource by the remote client if the lock token of the client matches the original lock token, wherein other clients that do not have a lock token that matches the original lock token are only provided with access to the resource according to a lock on the resource.

15. A method as defined in claim 14, wherein logging in to the computer system comprises providing a user name and a user password.

16. A method as defined in claim 14, wherein comparing the lock token received from the client to the original lock token further comprises a step for comparing a security token of the client with a saved security token that is associated with the original lock token.

17. A method as defined in claim 14, wherein accessing the locked resource further comprises restarting a timeout period of the locked resource.

18. In a computer system that has a resource that is accessible by one or more clients, wherein access to the resource is controlled by a lock, a method for terminating lock on the resource such that the access of the other clients to the resource is not controlled by the lock, the method comprising:
receiving a lock token from a remote client;
accessing a lock token index that stores all lock tokens that are associated with one or more resources of the computer system to determine an idle time between a previous use of the lock token and a current access of the lock token;
comparing the idle time with a timeout period associated with the lock token; and
terminating the lock on the resource if the timeout period is greater than the idle time.

19. A method as defined in claim 18, further comprises refreshing the timeout period if the timeout period is less than the idle time.

20. A method as defined in claim 18, wherein terminating the lock further comprises:
removing the lock token from the lock token index; and
releasing a resource handle of the resource such that the other clients can access and lock the resource.

21. In a computer system that has a resource that is accessible by one or more clients, wherein access to the resource is controlled by a lock that has a timeout period, a method for terminating a lock on a resource such that the lock does not control the access of the other clients to the resource, the method comprising:
examining each lock token stored in a lock token index, wherein each lock token corresponds to a different locked resource and wherein access to a particular locked resource depends on a type of lock placed on the particular resource;
computing an idle time for each lock token in the lock token index, wherein the idle time of each lock token represents when the corresponding resources were last accessed by a lock token owner; and
removing each lock token having the idle time greater than the timeout period from the lock token index such that the corresponding resource is unlocked.

22. A method as defined in claim 21, wherein the idle time is the difference between a last access time and a current time.

23. A method as defined in claim 21, wherein removing each lock token further comprises releasing a file handle associated with each lock token removed from the lock token index.

24. In a computer system that has one or more resources that are accessed by one or more clients, a method for locking a resource with a lock such that a client can control how other clients access the resource, the method comprising:
providing an original lock token to a client that is locking the resource, wherein a lock on the resource is associated with the original lock token;
storing the original lock token in a lock token index of the computer system;
receiving an access request for the resource from a new client, wherein the access request is granted if the resource is not locked;
requiring the new client to present a lock token that matches the original lock token before access to the resource is granted; and
providing the new client with access to the resource according to the lock on the resource if the new client does not present a lock token that matches the original lock token or providing the new client with access to the resource is the presented lock token matches the original lock token.

25. A method as defined in claim 24, wherein providing an original lock token to a client further comprises providing a resource handle of the resource to the client.

26. A method as defined in claim 24, wherein providing the new client with access to the resource according to the lock on the resource further comprises comparing the original lock token with the lock token presented by the new client.

27. In a computer system including a resource that is accessed by one or more clients, wherein some of the one or more clients make changes to the resource, a computer program product for implementing a method for serializing access to resources of the system by the one or more clients such that each change made to the resource by a client is not corrupted by the other clients, the computer program product comprising:
a computer-readable medium carrying computer-executable instructions for implementing the method wherein the computer executable instructions comprise:
program code means for receiving an access request from a client;
program code means for determining if the resource is locked, wherein an original lock token was issued to a locking client that locked the resource and the lock token was stored in a lock token index of the computer system, wherein a lock on the resource that corresponds to the lock token determines how clients other than the locking client access the resource;
program code means for requiring the client to present an access lock token to the computer system; and
program code means for comparing the access lock token presented by the client to the original lock token that is stored in the lock token index if the resource is locked; and
program code means for allowing the client to access the resource if the access lock token matches the original lock token.

28. A computer program product as in claim 27, wherein the program code means for comparing the access lock token further comprises program code means for:
obtaining a security token of the client;
comparing the security token of the client with a stored security token of the locking client; and
allowing the client to access the resource if the security token of the client matches the stored security token of the locking client.

29. A computer program product as in claim 27, wherein the program code means for allowing the client to access the resource further comprises program code means for providing a resource handle of the resource to the client.

30. In a computer system that has one or more resources that are accessible by one or more clients, a computer program product for implementing a method for accessing a locked resource of the system such that the locked resource is not corrupted by other clients, the computer program product comprising:

a computer readable medium carrying computer executable instructions for implementing the method, the computer executable instructions comprising:

program code means for authenticating the identity of a client using a log on process, wherein a security token is associated with the client;

program code means for receiving a lock token from the client;

program code means for comparing the lock token provided by the remote client to an original lock token that is stored in a lock token index of the computer system, wherein the original lock token was stored in the lock token index when the resource was locked; and program code means for allowing the remote client to access the locked resource if the lock token presented by the client matches the original lock token of the resource stored in the lock token index.

31. A computer program product as in claim 30, wherein the computer executable instructions further comprise program code means for comparing the security token associated with the client with a stored security token associated with the original lock token.

32. A computer program product as in claim 30, wherein the computer executable instructions further comprise program code means for restarting a timeout period of the locked resource.

33. In a computer system that has a resource that is accessible by one or more clients, wherein access to the resource is controlled by a lock on the resource, a computer program product for implementing a method for terminating a lock on a resource after a timeout period such that access to the resource by the other clients is not controlled by the lock, the computer program product comprising:

a computer readable medium carrying computer executable instructions for implementing the method, wherein the computer executable instructions comprise:

program code means for receiving a lock token from the remote client;

program code means for accessing a lock token index that stores all lock tokens that are associated with one or more resources of the computer system to determine an idle time between a previous use of the lock token and a current access of the lock token;

comparing the idle time with a timeout period of the lock token; and program code means for terminating the lock on the resource if the idle time is greater than the timeout period.

34. A computer program product as in claim 33, wherein the computer executable instructions further comprise program code means for:

removing the lock token from the lock token index; and releasing a resource handle of the locked resource such that other clients may lock the resource.

35. In a computer system that has a resource that is accessible by one or more clients, wherein access to the resource is controlled by a lock that has a timeout period, a computer program product for implementing a method for terminating a lock on a resource such that the lock does not control the access of the other clients to the resource, the computer program product comprising:

a computer readable medium carrying computer executable instructions for implementing the method, wherein the computer executable instructions comprise:

program code means for examining each lock token stored in a lock token index, wherein each lock token corresponds to a different locked resource and wherein access to a particular locked resource depends on a type of lock places on the particular resource;

program code means for computing an idle time for each lock token in the lock token index, wherein the idle time of each lock token represents when the corresponding resources were last accessed by a lock token owner; and program code means for removing each lock token having the idle time greater than the timeout period from the lock token index such that the corresponding resource is unlocked.

36. A computer program product as in claim 35, wherein the computer executable instructions further comprise program code means for releasing a resource handle associated with each lock token removed from the lock token index.

* * * * *

UNITED STATES PATENT AND TRADEMARK OFFICE
CERTIFICATE OF CORRECTION

PATENT NO.    : 6,499,031 B1
DATED         : December 24, 2002
INVENTOR(S)   : Hopmann et al.

It is certified that error appears in the above-identified patent and that said Letters Patent is hereby corrected as shown below:

Column 1,
Line 55, after "This problem is" please change "rot" to -- not --

Column 2,
Line 8, after "The global nature of" please change "he" to -- the --

Column 3,
Line 38, after "accessing a locked resource" please delete "and for accessing a locked resource"
Line 52, after "produce a collaborative" please change "uncork" to -- work --

Column 4,
Line 5, after "Rather than email a copy" please insert -- of --
Line 8, after "simply email the" please change "UTRL" and insert -- URL --
Line 64, after "minicomputers," please delete "main e" and insert -- maintenance --

Column 5,
Line 8, after "23 that couples" please delete "is 18"

Column 6,
Line 35, after "the present invention in" please change "farther" to -- further --
Line 47, after "One thread" please change ", f or" to -- , for --

Column 7,
Line 3, change "resource to be locked ," to -- resource to be locked, --
Line 52, after "When remote client" please change "90" to -- 80 --

Column 9,
Line 14, after "the remote client" please delete "is"
Line 27, after "any lock tokens, access" please insert -- is --
Line 37, after "to associate a" please delete "-"

UNITED STATES PATENT AND TRADEMARK OFFICE
CERTIFICATE OF CORRECTION

PATENT NO. : 6,499,031 B1
DATED : December 24, 2002
INVENTOR(S) : Hopmann et al.

It is certified that error appears in the above-identified patent and that said Letters Patent is hereby corrected as shown below:

Column 10,
Line 19, after "time out or expired," please change "their" to -- then --

Column 11,
Line 5, before "extra timeout period" please change "T he" to -- The --

Column 14,
Line 19, after "the resource" please change "is" to -- if --

Signed and Sealed this

Eighteenth Day of November, 2003

JAMES E. ROGAN
*Director of the United States Patent and Trademark Office*